United States Patent [19]

Trema

[11] Patent Number: 4,834,412
[45] Date of Patent: May 30, 1989

[54] MOTORCYCLE FRONT WHEEL SUSPENSION DEVICE

[75] Inventor: Daniel Trema, Bezons, France

[73] Assignee: Elf France, Courbevoie, France

[21] Appl. No.: 74,289

[22] Filed: Jul. 16, 1987

[30] Foreign Application Priority Data

Jul. 17, 1986 [FR] France ............................... 86 10406

[51] Int. Cl.$^4$ ........................................... B62K 25/08
[52] U.S. Cl. .................................... 280/276; 280/279
[58] Field of Search ............... 280/275, 276, 277, 279, 280/283, 286; 180/219, 227

[56] References Cited

U.S. PATENT DOCUMENTS

| 2,842,230 | 5/1987 | Ford | 280/666 |
| 4,265,329 | 5/1987 | De Cortanze | 180/219 |
| 4,526,249 | 7/1985 | Parker | 280/275 |

FOREIGN PATENT DOCUMENTS 2539375  7/1984  France ............................... 280/276

OTHER PUBLICATIONS

International World Publication WO86/03467, printed Jun. 1986, invented by Jean-Marie Flamme.

Primary Examiner—Charles A. Marmor
Assistant Examiner—Everett G. Diederiks, Jr.
Attorney, Agent, or Firm—Burgess, Ryan & Wayne

[57] ABSTRACT

A supporting and steering device for a front wheel of a motorcycle includes a single arm having a bent portion enveloping a portion of the periphery of the front wheel, a lower portion holding the wheel axle and an upper extension; a lower guiding arm having a first end rotatively mounted on the chassis in a position substantially perpendicular to the longitudinal median plane of the motorcycle and a second end; a first ball and socket joint which pivotally connects the second end of the lower guiding arm with the lower portion of the single arm; an upper connecting arm having a first end rotatively mounted on the chassis substantially perpendicular to the longitudinal median plane of the motorcycle and the second end; a second ball and socket joint which pivotally connects the second end of the upper connecting arm with the upper extension of the single arm; an imaginary line extending between centers of the first and second ball and socket joints constituting the steering axis of the front wheel about which the front wheel is angularly displaced for steering the motorcycle; and a suspension spring and shock absorber interposed between the upper extension of the single arm and the front peak of the motorcycle, with ends of the suspension spring and the shock absorber at least abutting the upper extension and the front peak, respectively.

5 Claims, 2 Drawing Sheets

MOTORCYCLE FRONT WHEEL SUSPENSION DEVICE

FIELD OF THE INVENTION
BACKGROUND OF THE INVENTION

The present invention relates to a front motorcycle wheel suspension device with a single supporting and wheel steering arm, the said arm being adapted, in order to steer the wheel, to turn about a steering axis orthogonal to that of the said wheel and located substantially in the median longitudinal plane of the motorcycle.

The suspension of a chassis or frame of a vehicle on a driving wheel has been considerably simplified in the type of suspension called henceforth "Mac Pherson suspension" and described for example in U.S. Pat. No. 2,842,230 corresponding to French patent published under No. 1 156 145. In this type of suspension, since then improved, the stub axle of the front wheel is carried by a damping tube connected by a link pivoted on the central portion of the frame and the body of the vehicle rests, from a relatively elevated supporting position, directly upon a helical spring interposed between an abutment shoulder of the shock-absorber tube and a bearing plate of the body.

This type of front suspension device has been proposed for motorcycles that require a front wheel support which is accurately centered in the plane of symmetry of the wheel, contrary to four-wheeled vehicles in which a cantilevered mounting of the wheel can easily be accepted. In the solution proposed, the single suspension front arm is connected at its upper end to a suspension and/or shock-absorber block interposed between this end and a front peak of the motorcycle chassis and comprises a bent portion which surrounds a part of the cross-section of the periphery of the wheel and a lower part carrying the wheel axle and provided with a ball-and-socket pivoting piece the pivoting center of which is substantially aligned with the steering axis and which cooperates with the end of a connecting arm rotationally mounted on an axle of the motorcycle frame, perpendicularly to the longitudinal median plane of the motorcycle. This arrangement generally gives satisfactory performances and has revealed to be that ensuring the best steering of the front wheel, but the manufacture of the connecting arm has proved to be very expensive and there has become desirable, for reasons relates to space requirement, to shift the helical suspension spring with respect to the steering axis.

OBJECTS OF THE INVENTION

One of the aims of the present invention is thus to apply to motorcycles and similar vehicles the "Mac Pherson" type suspension, to overcome the drawbacks mentioned herein-above and to provide a front motorcycle suspension device which is more compact, more efficient, more economical and which, more generally, allows improved integration of the requirements of riding qualitus and aesthetic features in the design of motorcycles and other two- or three-wheeled vehicles having a single steering wheel.

SUMMARY OF THE INVENTION

With this object in view, the invention provides a suspension device wherein the single arm is connected by a ball-and-socket joint, the pivoting center of which is substantially positioned on the orientation axis of the front wheel, to another connecting arm mounted rotatively on an axle of the motorcycle, chassis perpendicularly to the median plane of the motorcycle, the line joining the ball-and-socket pivoting centers of the two connecting arms constituting the steering axis of the front wheel, about which this wheel pivots for steering the vehicle.

According to one embodiment, the suspension and/or shock-absorbing block is articulated at one end to the front peak of the frame in the vicinity of the intersection of this peak with the steering axis of the front wheel and at the other end on an extension of the single arm substantially centered with respect to the median plane of the wheel and located about the ball-and-socketarticulation of the other connecting arm. The suspension or shock-absorbing block is connected at its other end to the extension of the single arm according to an axis or at a point spaced from the intersection of said extension with the steering axis. The extension of the single arm can thus be connected to at least one steering control link according to an axis or at a point defined, with respect to the steering axis, at a location substantially symmetrical to the connecting axis or point of the suspension and/or shock-absorbing block.

According to another embodiment, the suspension and/or shock-absorbing block comprises a shock-absorber body holding a spring articulated on the peak of the motorcycle chassis and extended downwards by a shock-absorber piston and spring cup support rod, articulated by a connecting shaft to the extension of the single arm.

According to the most general embodiment, the ball-and-socket articulations or joints which connect the two connecting arms to the vehicle chassis are each constituted by ball-and-socket joint rods carried in an adjustable way by the end of the corresponding connecting arm.

BRIEF DESCRIPTION OF THE DRAWING

Other aims, features and objects of the invention will become apparent from the following description of an embodiment which is given by way of non-limitative illustration with reference to the appended drawings.

DETAILED DESCRIPTION OF THE PREFERRED EMBODIMENT

Figure 1:
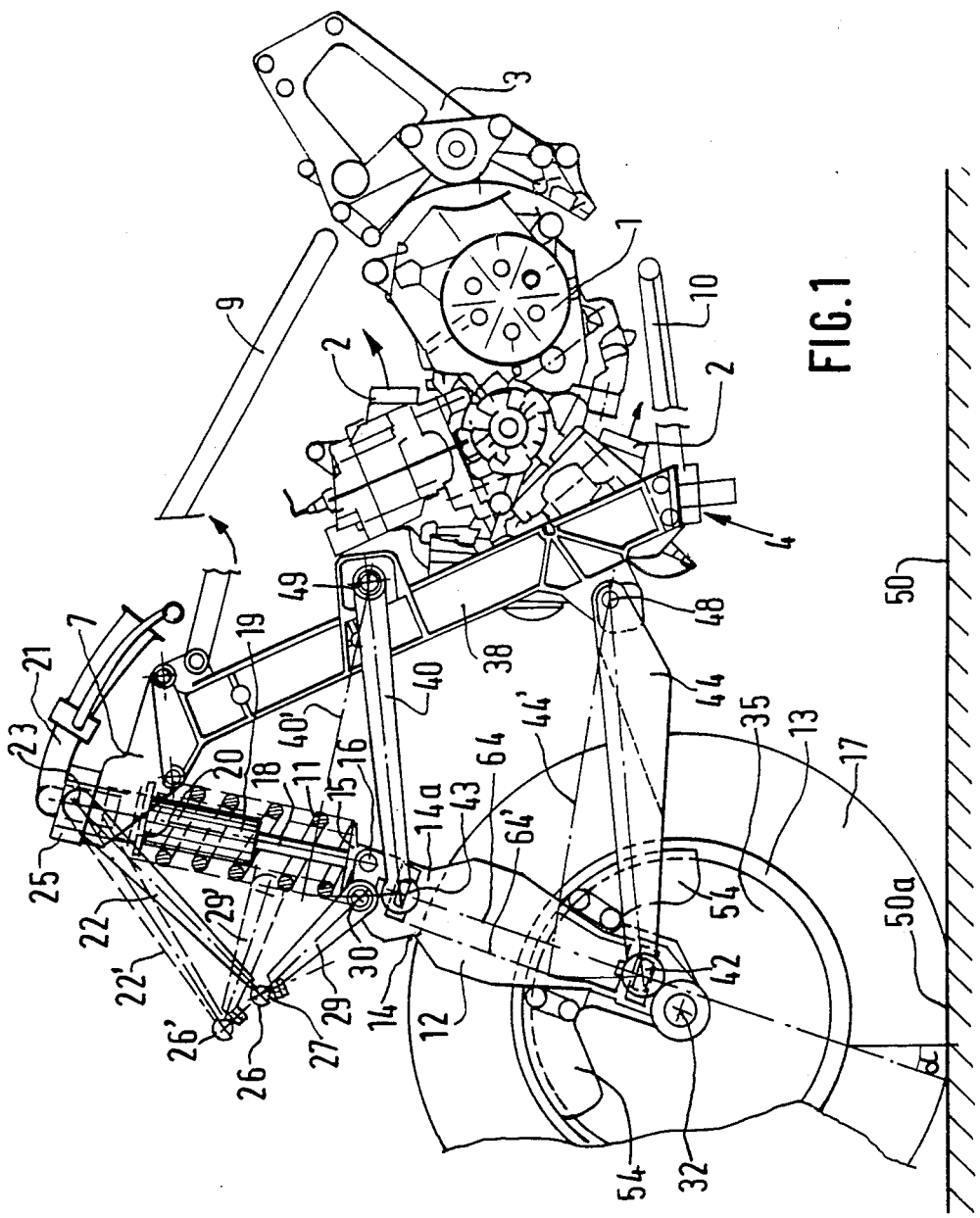
FIG. 1 is a schematic longitudinal view, with torn away ends and an exploded view of the engine, representing the front wheel suspension system of a motorcycle according to the invention.
Figure 2:
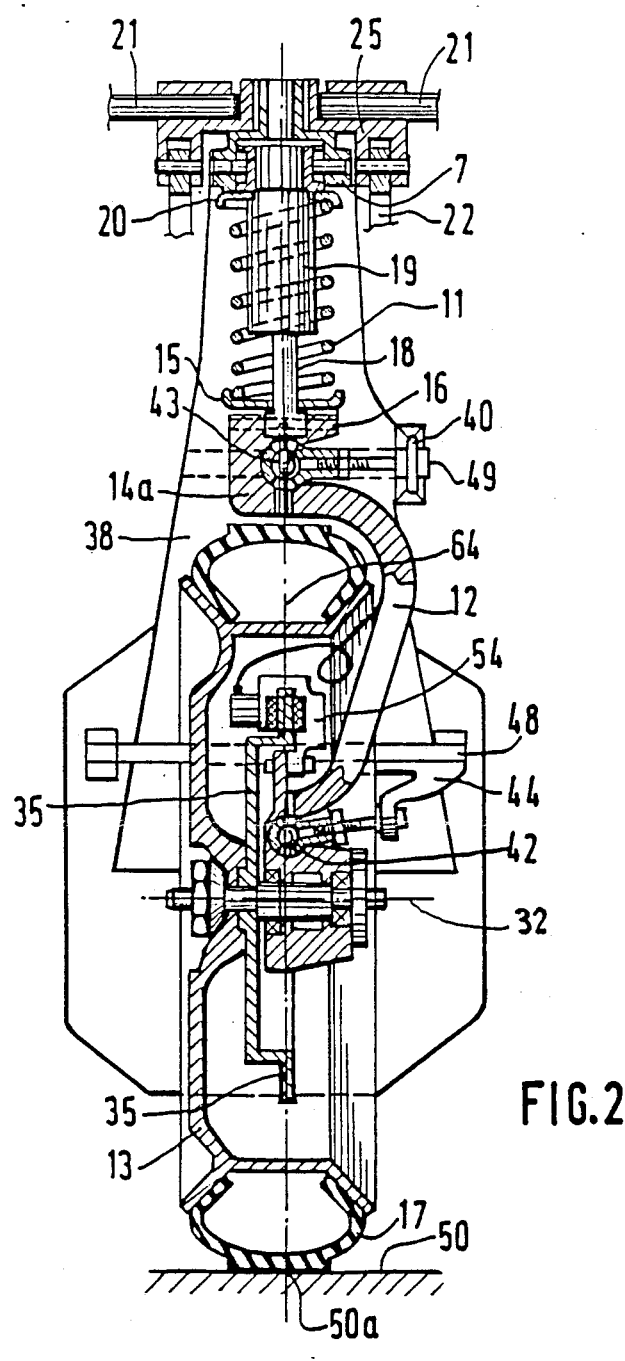
FIG. 2 is a front elevational view of the motorcycle of FIG. 1.

The motorcycle represented in the figure is fitted with means common to almost all motorcycles and which will simply be mentioned herein, such as the removable engine unit 1 with its exhaust pipes 2, the chassis comprising a removable rear support 3 and a front support 4 which are connected to each other through the intermediary of the engine unit 1 onto which they are bolted by screws (not represented) and high 9 and low 10 rods represented by broken segments thereof. The front support 4 is constituted by a cast integral beam 38 made of a light alloy and constituting a cradle which is connected by rods 9 and 10 to the rear support 3 and which is terminated towards the front by a peak 7 adapted to transfer the front load of the chassis to he front suspension system or device of the motorcycle, which will now be described.

The single support arm 12 of the front wheel 13 comprises a bent portion 14 which surrounds the cross-section of the wheel 13 by encasing, with a small clearance, the outside of the tire 17. Above the 17, the bent portion 14 has an upwardly directed extension 14a which is connected, on either side of the median steering axis 64 passing substantially through its center, respectively, by an axle 16 to a shock-absorber piston rod 18 and by an axle 30 to a lower steering link 29. The upper part of the shock-absorber body 19 is pivoted (in a manner not represented) to the peak 7 of the chassis and a suspension spring 11 is interposed between the cup 20 of the shock-absorber body 19 and a cup 15 integral with the shock-absorber piston rod 18.

The lower steering link 29 is connected y a ball-and-socket articulation or joint 26, 27 to an upper steering link 22 rotatively mounted on supports 25 adapted to be rotated by a handle-bar 21.

The single arm 12 is provided at its lower portion with a bore that receives the axle 32 of the front wheel 13 upon which it is rotatively mounted by stiff ball bearings or roller bearings (not represented). Adjacent to its central portion, the single arm 12 carries disk brake calipers 54 which surround a brake disk 35. On the steering axis 64 of the single arm 12 is provide, slightly above the wheel axle 32 and shifted relatively thereto, a ball-and-socket articulation 42 which is extended by a rod adjustably connected to a lower steering or guiding arm 44 mounting on the front support bar 38 of the engine block for rotation about an axis 48 substantially perpendicular to the median plane of the motorcycle, coinciding in a straight line with the median plane of the front wheel 13.

According to the invention, the upper extension 14a of the single arm 12 is connected by a ball-and-socket articulation 43 of the same type as the ball-and-socket articulation 42 and which thus passes through the median plane of the motorcycle, to an upper connecting arm 40 mounted on the front frame beam 38 for rotation about an axle 49. The line 64 which passes through the center of rotation of the ball-and-socket articulartions 42 and 43 constitutes the steering axis of the front wheel 13 and is inclined with respect to the vertical and placed slightly to the rear of the front wheel axle.

The operating of the front suspension device and of the motorcycle steering system represented in the figure will now be described in detail. During running, when the time of the front wheel 13 runs over an asperity on its running path 50, the engine block 1 must be lowered with respect to the bearing zone 50a defined between the front wheel 13 and the running path 50, as raised by the asperity. The connecting arms 40 and 44 thus rotate abut their axes of articulation 49 and 48 substantially perpendicular to the median plane of the motorcycle and are displaced in rotation in a series of planes parallel to this median plane, so that the ball-and-socket articulations 43 and 42 at the center of pivoting which is located in the median plane of the motorcycle, do not receive lateral loads under the effect of the relative rotation of the arms 40 and 44 with respect to the front support bar 38 of the engine unit 1. Under the effect of the rotation of the arms 40 and 44 with respect to the bar 38, the single arm 12 moves closer to the peak 7, thus compressing the helical spring 11 and displacing the piston rod 18 and, consequently, its piston inside the bore of the body 19 of the telescopic block, so as to damp the compressing of the suspension system. The single support arm 12 of the wheel is thus perfectly free to oscillate in accordance with the degree of compression of the front suspension system, while being guided at the same time by the connecting arms 40 and 44 and by the piston rod 18. During the oscillation of the arm 12 with respect to the peak 7, the inclination of the pivoting axis 64 of this arm 12 varies slightly, without impairing thereby the riding qualities of the motorcycle. In the figure, dash-dot lines and "prime" reference numerals indicate the displacements of the median lines of the connecting arms 40 and 44 in the case of maximum compression of suspension spring 11, axis 64 being then displaced to the location indicated at 64' without any substantial modification of its orientation, involving a variation of the so-called "rake angle" alpha of front wheel 13. Other dash-dot lines and "prime" reference numerals indicate the corresponding displacements of the steering links 22 and 29 which thus take the positions shown at 22' and 29'.

When the driver of the motorcycle turns the handle-bar 21, for example while entering a curve of the road, the steering links 22 and 20 which are mounted scissor-like to each other transmit the torque from the handle-bar 21 to the articulation axis 30 of the extension 14a which causes the single arm 12 to rotate about the pivoting axis 64 that passes through the centers of ball-and-socket articulations. The angular displacement of the wheel 13 with a view to steering the vehicle does not entail any substantial reaction on the connecting links 40 and 44, since the pivoting or steering axis 64 passes through the pivoting centers of the ball-and-socket joints 43 and 42 and furthermore, arms 40 and 44 as well as single arm 12 of the wheel support deice do not exert any abnormal forces on the steering links 22 and 29. It will be well understood that in a road curve the most significant action on the steering process will not be exerted generally by the handle-bar 21, but by the inclination of the bulk or assembly formed by the driver and the motorcycle, such inclination being initiated under the positive control of the driver who must, nevertheless, act on the handle-bar so as to initiate this inclination.

Apart from mechanical considerations related to the steering and the free oscillation of the suspension system, it should be noted that this novel type of suspension and steering system associated to a motorcycle wheel confers on the vehicle a most advantageous behaviour in the presence of horizontal forces acting on the front wheel 13 and absorbed by the two horizontal connecting arms 40 and 44 with only minimum bending and distorsion of the single arm 12, while also conferring on the vehicle an excellent aesthetic aspect, in spite of the asymmetrical arrangement of the linking system, which is inherent in this mode of supporting the front wheel.

In this embodiment of the invention, the removal of the front wheel 13 is very easily performed, since said wheel can be withdrawn laterally after unscrewing its fixing nut. The longitudinally off-set position of the axis of the suspension spring 11 in the direction toward the frame or chassis beam 38 reduces the bulk of the suspension device, this axis of spring 11 being not placed in coincidence with the orientation or steering axis 64.

The axis of articulation 48 connecting arm 44 can be placed on beam 38 of the front support 4 at different levels with respect to the rolling path 50 so as to vary the inclination of arm 44 to act on the rake variation curve and the "counter-bow" effect of the suspension device during braking. It is even possible to dispose the ball-and-socket joint or articulation 42 of arm 44 underneath the axle of wheel 32 while maintaining this connection in alignement with the steering axis 64. The efficient length of arms 40 and 44 is adjustable within narrow limits of longitudinal displacement, due to the adjustable connection of the corresponding ball-and-socket rod at the end of these arms, particularly by means of rotating an intermediary element. This arrangement allows the so-called "rake angle" alpha of single arm 12 to be varied with respect to the vertical and thus the steering characteristics (return, straight-line stability, torque at the moment of stopping) to be adapted in accordance with the envisage use of the motorcycle.

The invention is not limited ot the embodiment shown and described herein; many variants and modifications may be envisaged by those skilled in the art without departing from the spirit and scope of the invention as defined in the appended claims.

I claim:

1. A supporting and steering device for a front wheel of a motorcycle of the type having a wheel axle for rotatably mounting the front wheel, a chassis, a longitudinal median plane and a front peak, said device comprising:
   a single arm having a bent portion enveloping a portion of the periphery of the front wheel, a lower portion holding the wheel axle, and an upper extension;
   a lower guiding arm having a first end rotatively mounted on the chassis in a position substantially perpendicular to the longitudinal median plane of the motorcycle, and a second end;
   first ball and socket joint means for pivotally connecting the second end of said lower guiding arm with the lower portion of the single arm;
   an upper connecting arm having a first end rotatively mounted on the chassis substantially perpendicular to the longitudinal median plane of the motorcycle, and second end;
   second ball and socket joint means for pivotally connecting the second end of the upper connecting arm with the upper extension of the single arm;
   an imaginary line extending between centers of said first and second ball and socket joint means constituting the steering axis of the front wheel about which the front wheel is angularly displaced for steering the motorcycle; and
   a suspension spring and shock absorber interposed between the upper extension of the single arm and the front peak of the motorcycle, with ends of said suspension spring and said shock absorber at least abutting said upper extension and said front peak, respectively.

2. A device according to claim 1, wherein the shock absorber carries the suspension spring and is connected at one end thereof on said front peak in the vicinity of the intersection of said front peak and said steering axis of the front wheel, and is connected at the other end on the upper extension of said single arm, at a location substantially centered with respect to the median plane of the front wheel, and placed above the first ball-and-socket joint means.

3. A device according to claim 2, wherein said other end of the shock absorber is connected to said upper extension of said single arm at location which is spaced from the intersection of said extension and said steering axis.

4. A device according to claim 3, wherein said upper extension of said single arm is connected to at least one steering contol link at a location which is displaced, with respect to said steering axis, substantially symmetrically with reference to the point of connection of said shock absorber to said upper extension.

5. A device according to claim 1, wherein said shock absorber comprises a damper and spring holding body pivotally mounted on said front peak and extends downwardly by a shock absorber piston and spring-cup supporting rod which is pivotally connected by a connecting axle to said upper extension of said single arm.

* * * * *